United States Patent [19]

Swander

[11] 4,434,877
[45] Mar. 6, 1984

[54] TRUCK-MOUNTED BRAKE SYSTEM FOR RAILWAY CARS

[75] Inventor: Kenneth D. Swander, Lansing, Ill.

[73] Assignee: Hadady Corp., Lansing, Ill.

[21] Appl. No.: 429,122

[22] Filed: Sep. 30, 1982

Related U.S. Application Data

[63] Continuation of Ser. No. 236,139, Feb. 20, 1981, abandoned.

[51] Int. Cl.³ .................. B61H 13/28; F16J 15/16
[52] U.S. Cl. ............................. 188/52; 188/195; 188/322.18; 277/177; 277/188 R
[58] Field of Search ............... 188/52, 107, 153 R, 188/195, 229.1, 231, 322.16, 322.17, 322.18; 92/51, 52, 130 R; 277/188 R, 188 A, 177, 277/DIG. 8; 308/3.5

[56] References Cited

U.S. PATENT DOCUMENTS

| | | | |
|---|---|---|---|
| 1,816,077 | 7/1931 | Farmer | 308/3.5 |
| 2,277,124 | 3/1942 | Maliphant et al. | 92/130 R |
| 2,290,558 | 7/1942 | Helms | 92/130 R |
| 2,337,766 | 12/1943 | Newell | 92/130 R |
| 2,355,721 | 8/1944 | Foutz | 92/130 R |
| 2,533,531 | 12/1950 | Stephens | 277/188 R |
| 2,727,797 | 12/1955 | Snyder | 277/188 A |
| 2,797,971 | 7/1957 | Greenough | 277/177 |
| 2,973,978 | 3/1961 | Oppenheim | 277/188 A |
| 3,146,683 | 9/1964 | Hoffmann | 277/188 R |
| 3,207,271 | 9/1965 | Polanin et al. | 188/52 |
| 3,252,549 | 5/1966 | Koci et al. | 188/153 R |
| 3,335,825 | 8/1967 | Mersereau et al. | 188/52 |
| 3,378,108 | 4/1968 | McClure et al. | 188/52 |
| 3,386,533 | 6/1968 | Taylor et al. | 188/195 |
| 3,780,837 | 12/1973 | Haydu | 188/195 |

FOREIGN PATENT DOCUMENTS 905737 12/1945 France ..................... 277/188 R Primary Examiner—Douglas C. Butler
Assistant Examiner—R. R. Diefendorf
Attorney, Agent, or Firm—Cook, Wetzel & Egan, Ltd.

[57] ABSTRACT

A power cylinder unit, adapted for use in truck mounted, self-aligning railway freight car tread brakes comprises a housing, a bulkhead which seals the housing, and a rigid, but moveable piston rod. The housing includes an annular bearing adapted to provide lateral support for piston rod and a spring which urges the piston toward the bulkhead. The combination of the housing, the bulkhead and the piston head define a gas-tight space to which the brake operating compressed air is passed. The piston head includes three circumferential grooves adapted to receive a bearing ring, a fluid sealing ring and a lubricating ring. The cylinder may be eccentrically mounted.

9 Claims, 4 Drawing Figures

TRUCK-MOUNTED BRAKE SYSTEM FOR RAILWAY CARS

This application is a continuation of application Ser. No. 236,139, filed Feb. 20, 1981, abandoned.

The present invention provides an improved brake system for railroad cars, and particularly freight cars employing variable ratio levers wherein the power units are mounted on the trucks. The present invention provides a new form of power unit which has improved durability and a smaller diameter which permits a greater rail clearance and provides for mounting a relatively higher location on the truck which provides increased mechanical advantage.

BACKGROUND

Truck mounted brake systems are known in the prior art. More particularly truck mounted brake systems based on variable ratio levers have been described in the prior art such as Polanin et al U.S. Pat. No. 3,207,271. Such systems have been fabricated using power units of the type manufactured for the automotive industry, such as those manufactured and sold by Bendix-Westinghouse Automotive Airbrake Company under the trade name "ROTOCHAMBER". These power units, as described in the Polanin et al patent comprise a plate secured to the inner end of a piston rod which is engaged to the inner periphery of a flexible diaphragm, which has its outer periphery secured to the cylinder. The effective area of the cylinder is determined by the convolution of the diaphram. Such cylinders provide no transverse support for the inner end of the piston rod.

The power units are suspended from the bolster. In this configuration, the power units are subjected to constant vibration. Because the "ROTOCHAMBER" type of power unit provides only a single bearing surface for the piston rod (the other end being attached to a flexible diaphram) a number of failures have been found, as exhibited by scored piston rods and center boss bushings.

Further, because the prior art "ROTOCHAMBER" power units rely on flexible diaphrams, the effective working area is limited and in order to provide adequate working area, a relatively large diameter "ROTOCHAMBER" is required. Although brake cylinders of relatively large diameter were not a problem in the railway cars being produced in the 1960's, the availability of high strength steel has changed the design of freight cars. Today, freight cars with a capacity in the 70 to 100 ton range which weigh as little as 25 tons (50,000 lbs.) are perfectly feasible. However, the larger capacity cars require the use of springs which have a greater deflection. When loaded to capacity, such high capacity cars cause the springs to deflect to the point that very inadequate rail clearance is provided for brake system based on diaphram-type cylinders. Accordingly, brake cylinders of reduced outside diameter for a given effective area are required.

The brake system of the present invention is designed to overcome the problems of the prior art and provide the brake system which may be employed in the modern high capacity cars, as well as new cylinders which may be installed in the older cars as replacements for the existing brake systems and which meet current requirements of performance based on industry standards.

BRIEF DESCRIPTION OF THE PRESENT INVENTION

It has been found that brake systems of the prior art can be significantly improved by the use of a cylinder having two bearings of unequal diameter, one at the piston head or seal, and one where the rod enters the cylinder, as shown hereinbelow, in lieu of the power units shown in the prior art. More particularly, U.S. Pat. No. 3,207,271 to Polanin describes a brake system having variable ratio levers which were activated by the use of power units comprising a piston rod mounted in a cylinder with a single bearing. These units comprised a plate which was secured on the inner end of a piston rod which is attached to the periphery of a flexible diaphram.

It has been found that by the use of a cylinder to house a rigid but movable piston head and wherein the piston is supported by a plurality of bearings, the brake systems of the prior art can be improved. The cylinder contemplated by the present invention provides a fixed working area against which compressed air operates to provide linear braking force throughout the travel of the piston. Because of the multiple bearings, the cylinders of the present invention may be eccentrically loaded. Moreover, the cylinders of the present invention provide a relatively large working area for the piston, which approximates the inside diameter of the cylinder, thus producing the maximum braking power for a cylinder of a minimum diameter.

In producing high capacity freight cars, i.e., 100 ton capacity, it has been found necessary to employ spring groups that have a greater length of travel than the spring groups used in prior art cars of 50 to 70 ton capacity. Because of the greater degree of travel of the spring groups, it is impossible to produce truck mounted brake systems based on large diameter power means because there is inadequate rail clearance for such large diameter bolster-mounted devices. The cylinders of the present invention provide maximum braking power with minimum cylinder diameter, and thus may be used in braking systems in modern high capacity, long spring-travel freight cars.

The invention embodies many novel features, the details of construction and arrangements of parts which are hereinafter set forth in the specification and claims and illustrated in the accompanying drawings, forming a part herein, wherein:

Figure 1:
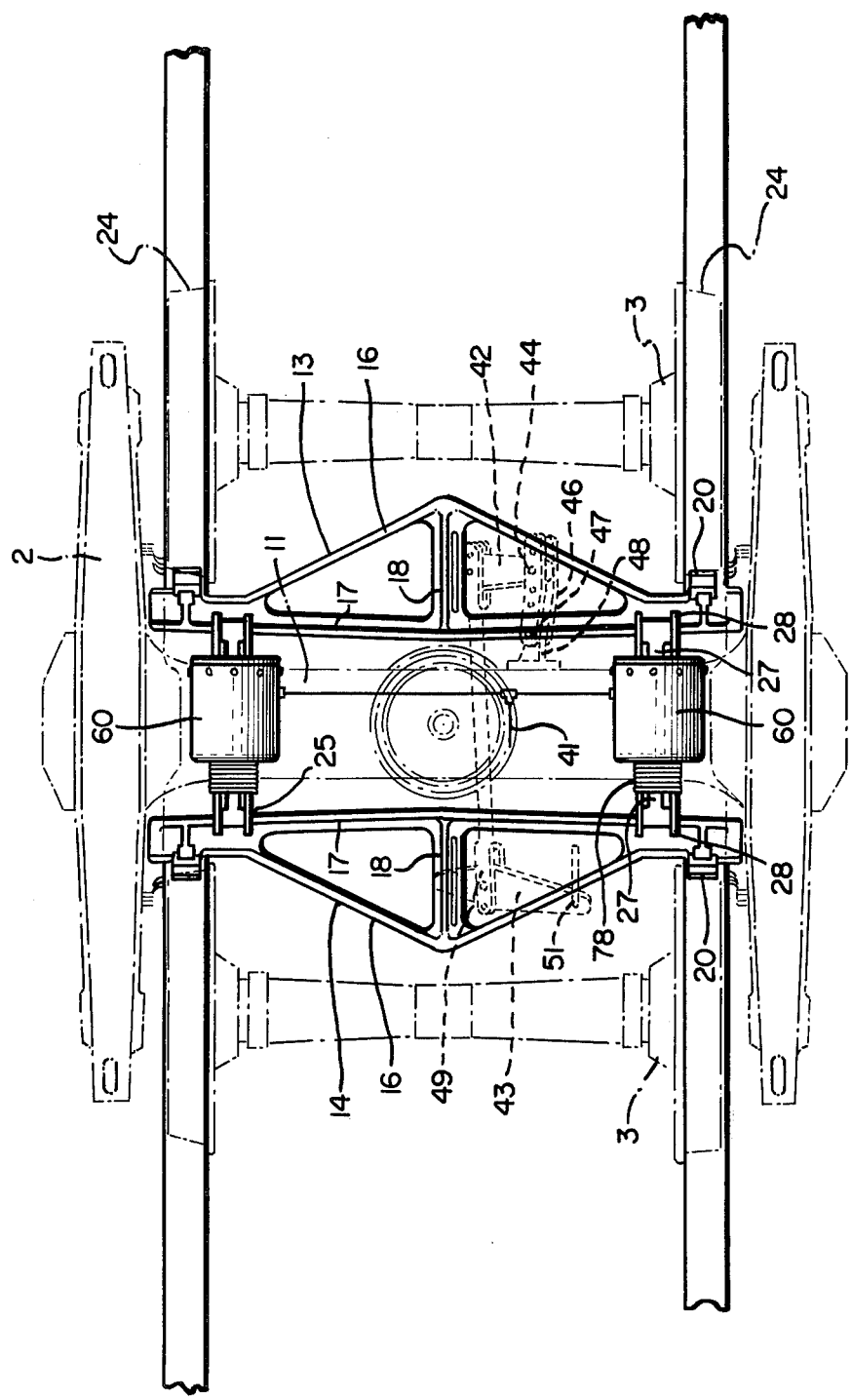
FIG. 1 is a top plan view illustrating a conventional four wheel railway car truck provided with a tread brake arrangement and the improved brake cylinders of the present invention.

Referring now to the drawings, the brake system of the present invention is illustrated as applied to a conventional four wheel freight car truck comprising side frames 2 supported at their ends by wheel and axle assemblies 3 which are supported in journal boxes 4 which engage side frame 2 in jaws 5.

Figure 2:
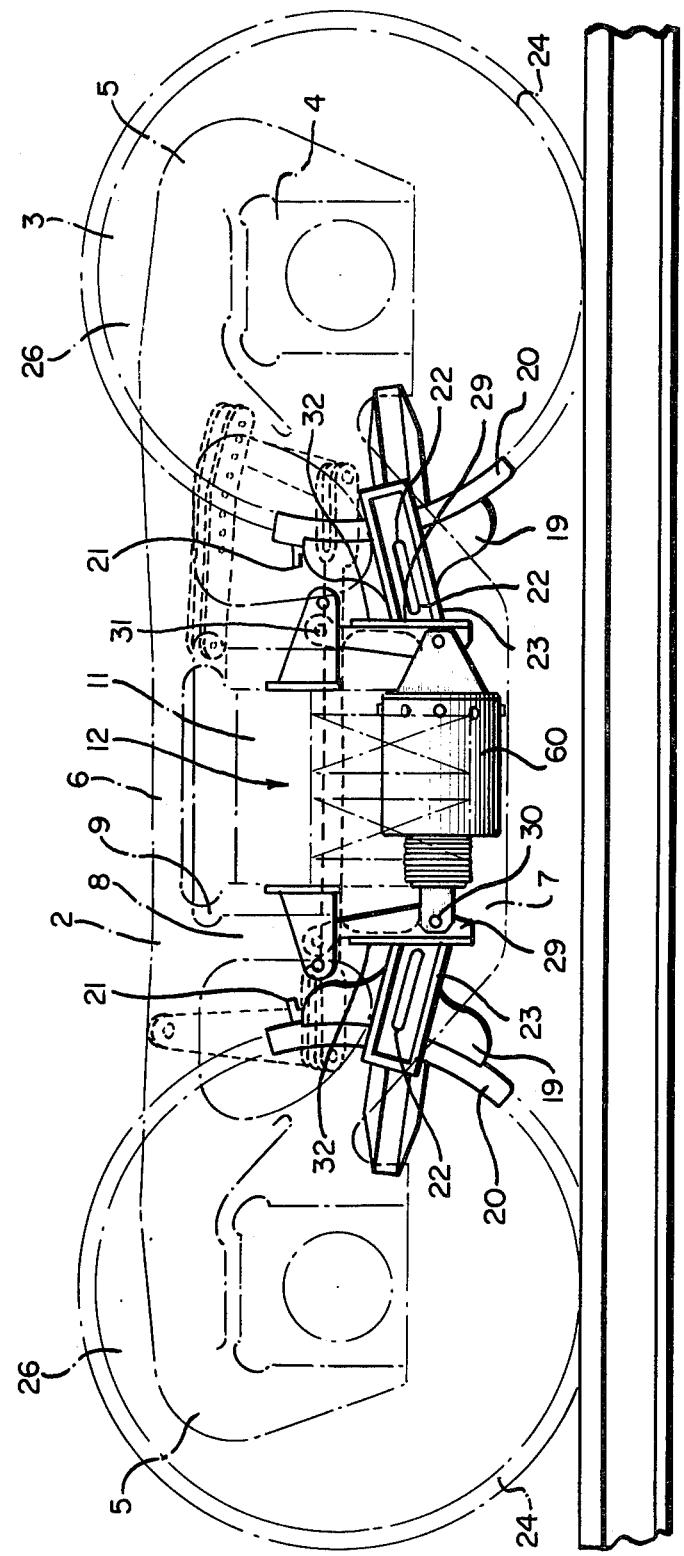
FIG. 2 is a side elevation of the structure shown in FIG. 1.

Each side frame 2 comprises an upper compression member 6 and a lower tension member 7 which are spaced apart by vertical columns 8 to define window 9 adapted to receive the end of bolster 11. The spring groups, indicated by reference numeral and arrow 12, are illustrated in FIG. 2 in phantom. The bolster is resiliently supported at its ends upon spring groups 12 seated on side frame tension member 7 between columns 8.

Conventional truss-type brake beams 13 and 14 are arranged on opposite sides of the bolster 11 adjacent their respective wheel and axle assemblies 3, each beam being shown as comprising a tension member 16 and a compression member 17 interconnected by a strut 18. The tension and compression members converge toward the ends of the beam to merge with brake heads 19 having brake shoes 20 detachably mounted thereon by means of keys 21. Guide lugs 22 are formed on the ends of each beam for sliding engagement between guide members 23 provided on the side frames, the beams 13 and 14 being guided for radial movement upwardly toward the longitudinal axis of the respective wheel and axle assemblies during braking engagement of the brake shoes 20 against the tread surfaces 24 of their respective wheels 26.

Brake lever support brackets 27 are secured to opposite sides of the bolster 11 adjacent to each end thereof, each bracket 27 having spaced arms 28 to receive the upper end of a brake lever 29 therebetween. Each brake lever 29 is pivotally supported on the arms 28 by means of a pivot pin 31, and is provided with a flat hardened wearplate 32 for sliding abutting engagement against a boss 25 located on the compression member 17 of its respective brake beam inboardly from and adjacent the brake head 19.

The power unit used in the present brake system comprises cylinder unit shown generally at 60. The cylinder unit 60 comprises housing assembly 62 which is preferably a deep drawn cylinder with some draft. Bulkhead 64 seals the open end of housing 62. Fitted within said housing is piston head 65 connected to rod assembly 68 by cap screw 69 and sealed by resilient washer assembly 70. Rod assembly 68 is surrounded by spring 66 which urges piston head toward said bulkhead, i.e., into the brake-released position. Preferably the piston head includes a plurality of fins 67 which serve as guides for spring 66.

Rod assembly 68 is supported by bearing 72 which is seated in the closed end of housing 62. In the preferred embodiment, bearing 72 generally comprises a plurality of brass bushings 74 and nylon bushing 75 which function to support, yet lubricate the rod 68 as the piston is moved within the cylinder assembly. In the preferred embodiment the cylinder unit 60 includes boot means 78, adapted to expand as the cylinder is operated and to keep the interior of the cylinder free from dirt and dust.

In the preferred embodiment, piston head 65 forms a gas-tight seal with housing 62 through the use of piston ring 80, O-ring 82 and felt lubricating ring 84. In the preferred embodiment bulkhead 64 is sealed to housing 62 through the use of O-ring 86. Air port 90 is provided in bulkhead 64 through which operating compressed air is fed to cylinder unit 60.

Figure 3:
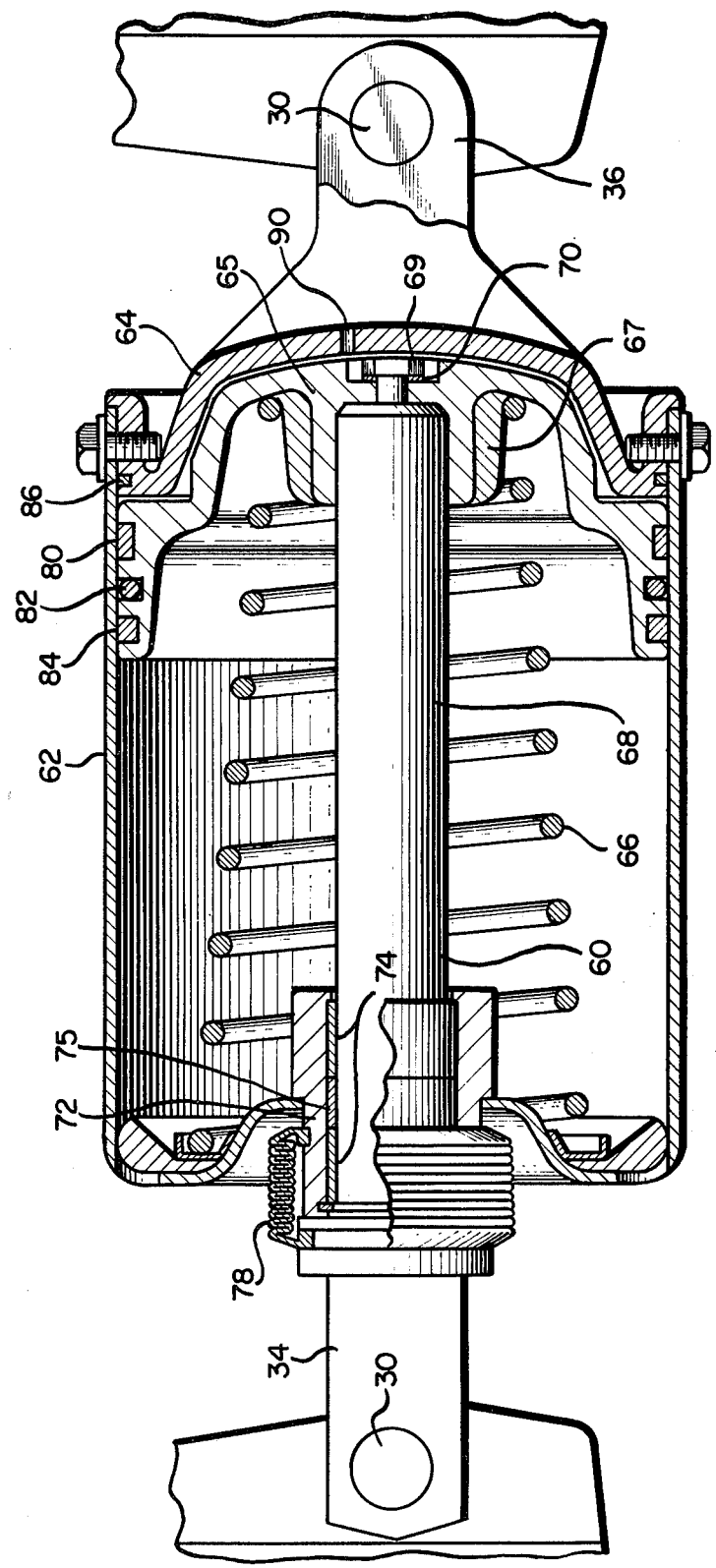
FIG. 3 is a side view, taken in section, of the brake cylinder of the present invention.

The cylinder unit 60 is pivotally connected at its ends to the lower ends of each pair of brake levers 29 by means of pivot pins 30 spaced downwardly from their respective brake beams. The back wall of the cylinder 36 is pivotally connected to one brake lever 29, while the outer end of the piston rod 34 is pivotally connected to the companion brake lever, as shown in FIGS. 2 and 3. The two power cylinders are adapted to be connected to a suitable source of pressurized air by means of a common conduit 41.

The brake rigging of the present invention may be provided with a hand brake mechanism which allows for manual operation of the brake shoes in a manner which does not involve the operation of the power cylinders. As is shown in FIGS. 1 and 2, the brake system may be provided with hand brake levers 42 and 43 which are pivotally connected at their lower ends to their respective brake beam struts 18. The upper ends of the lever 42 is pivotally connected at 44 to a fulcrum member 46 which is pivotally connected at 47 to a bracket 48 secured on the bolster 11. The levers 42 and 43 are interconnected intermediate their ends by a link 49 which passes through an opening in the bolster. The upper end of the lever 43 is adapted to be connected by a rod 51 to any conventional manually operable brake applying mechanism.

Figure 4:
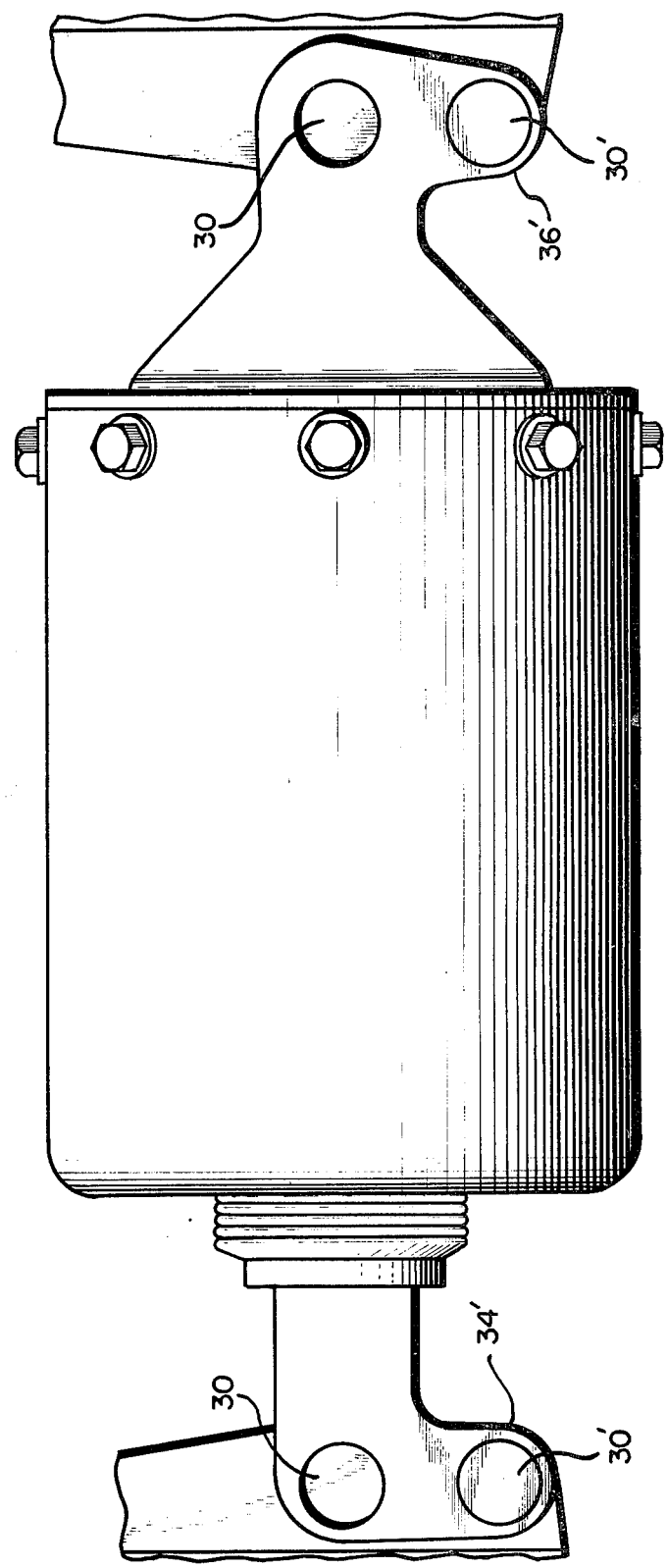
FIG. 4 is a side view of a brake cylinder of the preferred invention showing the eccentric loading embodiment.

The cylinder fitted with the eccentrically loading embodiment is illustrated in FIG. 4. In this embodiment, the back wall of the cylinder 36 includes lateral downward extension 36'. Similarly, the outer end of piston rod 34 includes lateral downward extension 34'. Openings in extensions 34' and 36' are adapted to receive pins 30' and 30' which connect the cylinder to the respective brake levers 29. This embodiment provides a cylinder which can be mounted at a somewhat higher position, i.e., closer to the bolster. Because the cylinder of the present invention has a relatively large working area, the higher placement provides for greater rail clearance and a power means with the capability to apply the force generated by the large working area to a brake system without the loss of mechanical advantage. The use of multiple bearing surfaces within the cylinder is essential in the eccentrically loaded cylinder.

It is further contemplated that in the eccentrically loaded embodiment, shown in FIG. 4, the cylinders of the present invention may be sold as an item of commerce with no pin openings. In such cylinders, it is contemplated that the openings for pins 30' would be drilled at the point of installation in order to provide the desired bolster spacing, rail clearance, and braking ratios.

In the operation of the brake rigging thus shown and described, pressurized air is supplied to the cylinder units 60 through conduit 41 and port 90 to cause bulkhead 64 and the respective rod assemblies 68 to move in opposite directions and thereby pivot the brake levers 29 toward their respective wheel and axle assemblies 3. The flat front faces on the hardened wearplates 32 on the brake levers act against their respective hardened bosses 25 on the brake beams 13 and 14 to move the brake shoes 20 into engagement against the tread surfaces 24 of the wheels 26. Upon discharge of the air from the cylinder units, the springs 66 act to move the piston heads 65 toward the bulk head 64 of the cylinder and thereby pivot the brake levers 29 toward each other and thereby permit the brake beams to move by gravity away from their respective wheel and axle assemblies.

It will be noted that the brake rigging is adapted to apply a variable braking force to decelerate the wheel and axle assemblies, the force exerted being dependent upon the load supported upon the bolster. As the load applied on the bolster increases, it will be noted that the distance between the pivot pins 31 and the point of contact between the wearplates 32 and bosses 25 decreases whereby the brake levers act to apply a greater braking force to decelerate the wheel and axle assemblies.

FIG. 3 shows piston rod 68 as a single monolithic unit, but those skilled in the art will understand that various forms of adjustability may be adapted to the rod unit in order to compensate for brake shoe wear and wheel wear. For example, the rod 68 and/or housing 62 may be adjusted through longitudinal threads, through multiple mounting holes, or by other slip features known to those skilled in the art.

Although it is preferred that cylinder unit 60 be a deep drawn cylinder with some draft, it is considered important that the inside of the cylinder be essentially cylindrical, i.e., uniform diameter. The cylinder, obviously could be drawn from either end, with the wall thickness varying from one end to the other. The present invvention further contemplates the cylinder which is cast and machined to give a proper working diameter and with one or both ends being filled by appropriate fittings.

It is considered essential that the cylinder be equipped with two bearings of unequal diameter, one at the rod, and one at the piston head seal area.

By way of comparison, a brake cylinder within the present invention may be fabricated with an outside diameter of 7.342 inches and an effective working area of 40 square inches. This is contrasted with the existing or prior art cylinders sold under the trade name "RO-TOCHAMBER" wherein a cylinder with an effective working area of 30 square inches has an outside diameter of 7-1/16 inches; a cylinder with an effective working ares of 36 square inches has an outside diameter of 7⅝ inches; and a cylinder with an effective working area of 50 square inches has an outside diameter of 8⅞ inches.

Power cylinders of the present inventin can provide minimum braking forces of 6.5% of a loaded car of up to 100 tons capacity, while still meeting the maximum braking forces of 30% of the weight of an empty car as is currently specified by AAR. This is accomplished by effectively locating the cylinder as near to the bolster as possible and providing for the required rail clearance by locating the cylinder as high off the rail as possible. Thus the power cylinder of the present invention may be used in 100 ton capacity rail cars equipped with D7 springs (4¼ inches travel to solid) and still retain the minimum rail clearance of 2¾ inches, under full worn conditions, as specified by AAR. As will be obvious to those skilled in the art, such a system could not be produced with a 50 square inch "ROTOCHAMBER" (outer diameter 8.78 inches).

The forms of invention herein shown and described are to be considered only illustrative. It will be apparent to those skilled in the art that numerous modifications may be made therein without departure from the spirit of the invention or the scope of the appended claims.

What is claimed is:

1. A single-acting power cylinder unit adapted for use in truck-mounted, self-aligning railway freight car tread brakes adapted to be used with brake levers pivotally suspended from a railway car bolster, which levers move brake beams toward respective wheel and axle assemblies, said power cylinder unit adapted to be pivotally connected to the lower ends of said brake levers, said power cylinders comprising:
    a one-piece housing, which includes a cylinder with one closed end;
    a bulkhead sealing the other end of said housing;
    a rigid but movable piston head positioned within the cylinder of said housing, said piston head rigidly affixed to a piston rod;
    spring means, within said housing, adapted to urge said piston head toward said bulkhead;
    an annular bearing mounted in the closed end of said housing adapted to provide lateral support for said piston rod, the combination of said housing, said bulkhead and said piston head defining a gas-tight space;
    said piston head comprising a skirt having three circumferential grooves on the exterior surface, said grooves adapted to receive a bearing ring, a fluid sealing ring and a lubricating ring, in that order sequentially starting from said gas-tight space; and
    a compressed gas port adapted to pass compressed gas into said gas-tight space.

2. A power cylinder unit, as defined in claim 1, wherein said spring is conical with the larger end toward the closed end of the housing.

3. A power cylinder as defined in claim 1, wherein the piston head includes a crown which extends into the bulkhead beyond the cylinder.

4. A power cylinder unit, as defined in claim 1, wherein said power cylinder unit is provided with transverse extensions adapted to cooperate with brake levers, whereby said power cylinder unit may be eccentrically loaded.

5. In a tread brake rigging for self-aligning railway freight car truck having side frames supported at their ends upon wheel and axle assemblies and a bolster resiliently supported at its ends for vertical movement upon spring groups seated on the side frames, two brake beams arranged on opposite sides of the bolster and slidably supported at their ends upon the side frames for movement toward and away from their respective side frames for movement toward and away from their respective wheel and axle assemblies, two convex bosses on each brake beam adjacent the ends thereof, brake shoes on opposite ends of said beams to frictionally engage the tread surfaces of their respective wheels, two brake levers having upper and lower ends, said brake levers being pivotally suspended from each side of the bolster and having flat wearplates thereon for sliding abutting engagement against their respective brake beam bosses, power means pivotally connected to the lower ends of said brake levers to move said brake beams toward their respective wheel and axle assemblies to frictionally engage the brake shoes against the wheel tread surfaces, said power means comprising single acting power cylinders comprising:
    a one-piece housing, which includes a cylinder with one closed end;
    a bulkhead sealing the other end of said housing;
    a rigid but movable piston head positioned within the cylinder of said housing and rigidly affixed to a piston rod;
    spring means within said housing, adapted to urge said piston head toward said bulkhead;
    an annular bearing mounted in the closed end of said housing adapted to provide lateral support for said piston rod, the combination of said housing, said bulkhead and said piston head defining a gas-tight space;
    said piston head comprising skirt having three circumferential grooves on the exterior surface, said grooves adapted to receive a bearing ring, a fluid sealing ring and a lubricating ring, in that order sequentially starting from said gas-tight space; and a compressed gas port adapted to pass compressed gas into said gas-tight space.

6. A tread brake rigging as described in claim 5, wherein said power cylinders are connected to the lower ends of said levers, and said brake levers acting to apply a progressively increasing braking force against said brake beams responsive to downward movement of the bolster relative to the side frames, said convex brake beam bosses extending longitudinally on the brake beams for line engagement against their respective wearplates.

7. A tread brake rigging as defined in claim 5, herein said spring is conical with the large end toward the closed end of the housing.

8. A tread brake rigging as defined in claim 5, wherein the piston head includes a crown which extends into the bulkhead beyond the cylinder.

9. A tread brake rigging as defined in claim 5, wherein said power cylinders are provided with transverse extensions adapted to cooperate with brake levers, whereby said power cylinders may be eccentrically loaded.

* * * * *